United States Patent

Oh et al.

[11] Patent Number: 5,889,262
[45] Date of Patent: Mar. 30, 1999

[54] SYSTEM FOR AND METHOD OF AUTOMATICALLY CONTROLLING AMOUNT OF INPUT HEAT IN HIGH-FREQUENCY ELECTRIC RESISTANCE WELDING MACHINE

[75] Inventors: Joo-Sup Oh, Kyansang-bukdo; Yoo-Sup Jung, Kyunsang-bukdo; Yong-Suk Kim, Seoul, all of Rep. of Korea

[73] Assignee: Seah Steel Corporation, Kyunsang-bukdo, Rep. of Korea

[21] Appl. No.: 856,878

[22] Filed: May 15, 1997

[51] Int. Cl.$^6$ .................................................. B23K 13/01
[52] U.S. Cl. ........................................... 219/608; 219/61.5
[58] Field of Search .................................... 219/608, 607, 219/665, 617, 663, 61.2, 61.5, 110, 109

[56] References Cited

U.S. PATENT DOCUMENTS

| | | | |
|---|---|---|---|
| 3,591,851 | 7/1971 | Drushel et al. | 307/702 |
| 4,254,323 | 3/1981 | Takamatsu et al. | 219/110 |
| 4,621,176 | 11/1986 | Kliesch et al. | 219/61.5 |
| 4,649,256 | 3/1987 | Minamida et al. | 219/121 |
| 4,795,877 | 1/1989 | Bridgstock et al. | 219/109 |
| 4,896,812 | 1/1990 | Kazlauskas et al. | 228/32 |
| 4,963,707 | 10/1990 | Zyokou et al. | 219/110 |
| 5,140,126 | 8/1992 | Ishibashi et al. | 219/110 |
| 5,306,889 | 4/1994 | Kaneko et al. | 219/69.12 |
| 5,308,948 | 5/1994 | Kawagoe et al. | 219/110 |

FOREIGN PATENT DOCUMENTS

| | | | |
|---|---|---|---|
| 56-56723 | 5/1981 | Japan | 219/608 |
| 57-56182 | 4/1982 | Japan | 219/608 |
| 1258-656-A | 9/1986 | Russian Federation | 219/608 |

*Primary Examiner*—Teresa Walberg
*Assistant Examiner*—Jeffrey Pwu
*Attorney, Agent, or Firm*—Levine & Mandelbaum

[57] ABSTRACT

A system and a method for automatically controlling an input heat amount of a high-frequency electric resistance welding machine. The automatic input heat amount control system includes a coil antenna for sensing a spark signal which is generated by electromagnetic waves produced on portions of an object to be welded, a spark signal processing unit for filtering a desired signal component of the spark signal sensed by the coil antenna, separating the filtered signal component into amplitude and frequency signal components and processing the separated amplitude and frequency signal components, an induction coil mounted on the object for generating melting heat, an oscillator for supplying high-frequency current to the induction coil, a welding machine controller for controlling the amount and frequency of current being supplied from the oscillator to the induction coil, a welding machine power controller for controlling the output of the welding machine controller, and a main controller connected to the spark signal processing unit and the welding machine power controller, for controlling the output of the welding machine power controller in response to a spark signal fed back from the spark signal processing unit to establish the optimum welding condition.

4 Claims, 4 Drawing Sheets

SYSTEM FOR AND METHOD OF AUTOMATICALLY CONTROLLING AMOUNT OF INPUT HEAT IN HIGH-FREQUENCY ELECTRIC RESISTANCE WELDING MACHINE

FIELD OF THE INVENTION

The present invention relates to a system for and a method of automatically controlling the amount of input heat in a high-frequency electric resistance welding apparatus, and more particularly to such a control system and method for controlling an electric resistance welding apparatus used for the manufacture of electric resistance weld pipes.

DESCRIPTION OF THE PRIOR ART

Electric resistance welding is used to weld an object to another object by melting portions of the objects to be welded using electric resistance heat. A variety of electric resistance welding machines have been used. In terms of the welding method, such electric resistance welding machines include a spot welding machine, wherein the welding is carried out under the condition in which portions of objects to be welded overlap with each other, a projection welding machine, a seam welding machine, a butt welding machine, wherein the welding is carried out under the condition in which portions of objects to be welded face each other, a flash butt welding machine, a percussion welding machine, and a soldering machine, in which portions of objects to be welded are directly melted. In terms of the method of supplying electric power to a welding machine, the electric resistance welding machines also include a general AC single-phase welding machine, a low reactance welding machine, and a heat-accumulated welding machine. In terms of the method of applying pressure portions of objects to be welded, the electric resistance welding machines include a manual pressure application type welding machine, an electric power application type welding machine, a pneumatic pressure application type welding machine, a hydraulic pressure application type welding machine and an electro-magnetic force application type welding machine. In terms of the control method, the electric resistance welding machines also include an asynchronously controlled welding machine, a quasi-synchronously controlled welding machine, a synchronously controlled welding machine, and a computer-based welding machine. The computer-based welding machine includes an input voltage-controlled welding machine, a welding transformer input current-controlled welding machine, a welding currentcontrolled welding machine, a nugget voltage-controlled welding machine, a welding power-controlled welding machine, a pressure/power-controlled welding machine, a welding condition selection-controlled welding machine, and a nuggetcontrolled welding machine.

In all the above noted electric resistance welding machines, resistance heat is generated by supplying a large amount of current to an electric resistance existing in contact portions of objects to be welded. The objects are welded together using such resistance heat. The principle of such electric resistance welding will now be described in detail.

Resistance heat Q generated at an electric resistance is proportional to the resistance value R of the electric resistance and the square of current I supplied to the electric resistance as expressed by the equation: $Q=0.24 \times I^2 Rt$ (cal). Accordingly, it is required to increase the amount of current supplied to the objects to be welded for an increase in resistance heat. A large amount of current can be supplied using a small amount of power VA under the condition in which the voltage being supplied is lowered.

When current is supplied to two sheets of objects to be welded under the condition in which the tip of an electrode is in contact with a selected one of the objects, a maximum resistance is generated at portions of those objects being in contact with each other. A minimum resistance is generated in the bulk portions of the objects. A medium resistance between the maximum and minimum resistances is exhibited at areas where the tip of the electrode is in contact with the selected object. As a result, a maximum amount of heat is generated at the portions of the objects being in contact with each other when current is supplied to the objects via the electrode tips. A minimum amount of heat is generated in the bulk portions of the objects. A medium amount of heat between the maximum and minimum heat amounts is generated at areas where the tip of the electrode is in contact with the selected object.

On the other hand, it is necessary to apply an appropriate pressure to the objects in order to generate heat in the objects, thereby welding those objects. Furthermore, it is required to appropriately adjust the amount of current and the current supply time in accordance with the metallic characteristics of the objects in order to obtain a good welding quality.

Among the above-mentioned electric resistance welding machines, the present invention concerns the high-frequency electric resistance welding machine. In such a high-frequency electric resistance welding machine, high-frequency current is supplied to portions of objects to be welded. Induction heat is generated in the objects by the supplied high-frequency current, so that the objects are welded. The supplied current has a high frequency of 300 to 1,000 KHz. When current is supplied in the objects under the condition in which a contact member is in contact with a selected one of the objects, a closed circuit is established which has a minimum length extending from the contact member. An induction heating phenomenon occurs in the circuit, thereby melting portions of the objects to be welded.

Such a high-frequency electric resistance welding is mainly used in the manufacture of electric resistance weld pipes because it has a very high welding speed and exhibits a low rate in the generation of welding defects. In particular, the high-frequency electric resistance welding exhibits a good welding quality while being inexpensive. Accordingly, the high-frequency electric resistance welding method is mainly applied to articles, which should have a high quality, such as oil or gas supply pipes, oil well pipes and steel pipes for mechanical constructions. Since such electric resistance weld pipes are used for important purposes as mentioned above, it is necessary to strictly manage the generation of defects at the welded portions of the electric resistance weld pipes.

In order to minimize the rate of the generation of defects at the welded portion of a steel pipe manufactured using the above-mentioned high-frequency electric resistance welding method, an automatic input heat control apparatus -has been proposed which is adapted to automatically control the amount of input welding heat in objects to be welded. Such an automatic input heat control apparatus senses parameters, such as a welding speed and a rough welding thickness, having an influence on the welding quality. Based on the sensed parameters, the automatic input heat control apparatus automatically adjusts the amount of input welding heat necessary for an appropriate welding condition.

The automatic input heat control apparatus used in association with the high-frequency electric resistance welding method includes utilizing a variation in oscillating frequency, utilizing the shape of beads, and utilizing the welding temperature or the welding temperature distribution, in terms of the kind of a feedback signal used in the apparatus. In particular, the automatic input heat control apparatus utilizing a variation in oscillating frequency is disclosed in Japanese Patent Publication Nos. Hei. 3-34432 and Sho. 52-111851. In this automatic input heat control apparatus, a variation in oscillating frequency is used as a feedback signal for automatically controlling the amount of input welding heat. As the amount of input welding heat increases, a variation in oscillating frequency increases. When the amount of input welding heat further increases at a maximum variation in oscillating frequency, the oscillating frequency variation decreases from its maximum value. This automatic input heat control apparatus utilizes such a principle. That is, the automatic input heat control apparatus automatically maintains an appropriate welding condition by maintaining the amount of input welding heat in a second welding zone where a maximum variation in oscillating frequency is exhibited.

However, such an apparatus uses a troublesome process requiring a sophisticated technology because an appropriate welding range should be set in accordance with the thickness of an object to be welded and the welding speed every time the amount of input welding heat varies between the minimum and maximum values. As a result, there is a degradation in productivity.

SUMMARY OF THE INVENTION

Therefore, an object of the invention is to solve the above-mentioned problems involved in the prior art and to provide a system for and a method of automatically controlling the amount of input heat in a high-frequency electric resistance welding apparatus, which are capable of measuring the frequency and amplitude of sparks generated at portions of objects to be welded, and using the measured values as a feedback signal for controlling the amount of input welding heat, thereby achieving a convenient and accurate input heat control.

In accordance with one aspect, the present invention provides an automatic input heat amount control system for a high-frequency electric resistance welding machine, comprising: sensing means for sensing a spark signal which is generated by electromagnetic waves produced on portions of an object to be welded; spark signal processing means for filtering a desired signal component of the spark signal sensed by said sensing means, separating the filtered signal component into amplitude and frequency signal components and processing the separated amplitude and frequency signal components; heat generation means mounted on said object for generating melting heat; oscillation means for supplying high-frequency current to said heat generation means; welding machine control means for controlling the amount and frequency of current being supplied from said oscillation means to said heat generation means; welding machine power control means for controlling the output of said welding machine control means; and main control means connected to said spark signal processing means and said welding machine power control means, for controlling the output of said welding machine power control means in response to a spark signal fed back from said spark signal processing means to establish the optimum welding condition; whereby the optimum welding condition is established when an electric resistance weld pipe is manufactured by said high-frequency electric resistance welding machine.

In accordance with another aspect, the present invention provides a method for automatically controlling an input heat amount of a high-frequency electric resistance welding machine, comprising the steps of: (a) measuring amplitudes and frequencies of sparks varying with the amount of current being supplied to a heat generator and setting a plurality of welding zones according to the measured results; (b) selecting the optimum one of said welding zones set at said step (a) according to a welding condition; (c) starting welding in said welding zone selected at said step (b) and measuring the amount of spark generated during welding; (d) comparing the spark amount measured at said step (c) with that in said welding zone selected at said step (b); and (e) adjusting the amount of current being supplied to said heat generator in accordance with the result compared at said step (d); whereby the optimum welding condition is established when an electric resistance weld pipe is manufactured by said high-frequency electric resistance welding machine.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
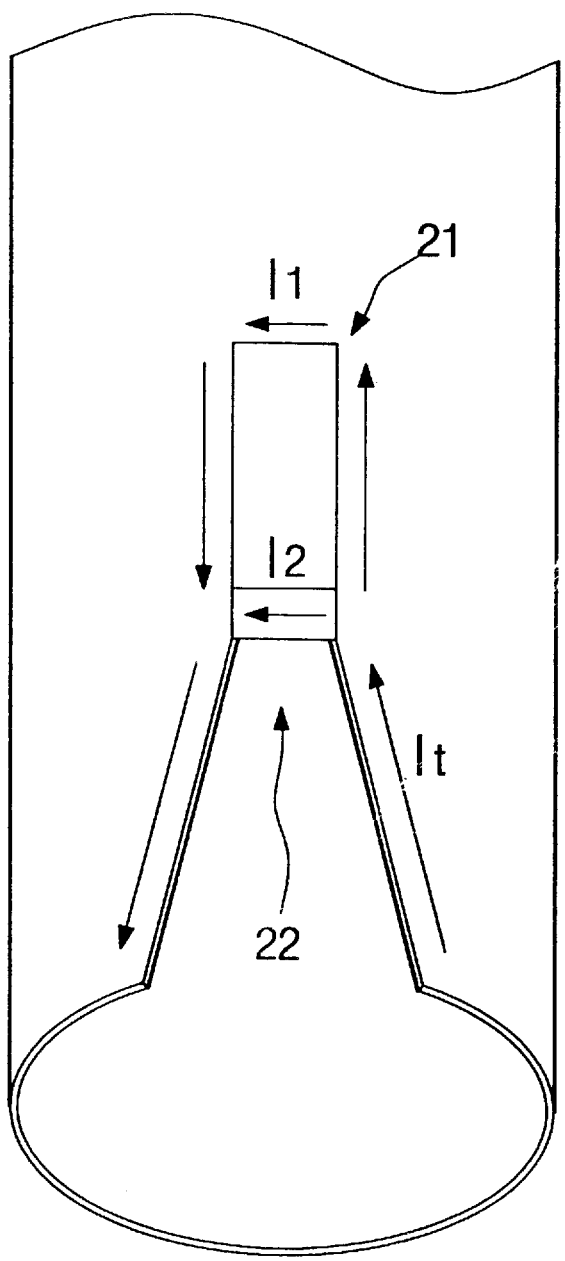
FIG. 1 is a schematic view illustrating a flow of current generated in an object to be welded in the manufacture of an electric resistance weld pipe using a high-frequency electric resistance welding apparatus.
Figure 2:
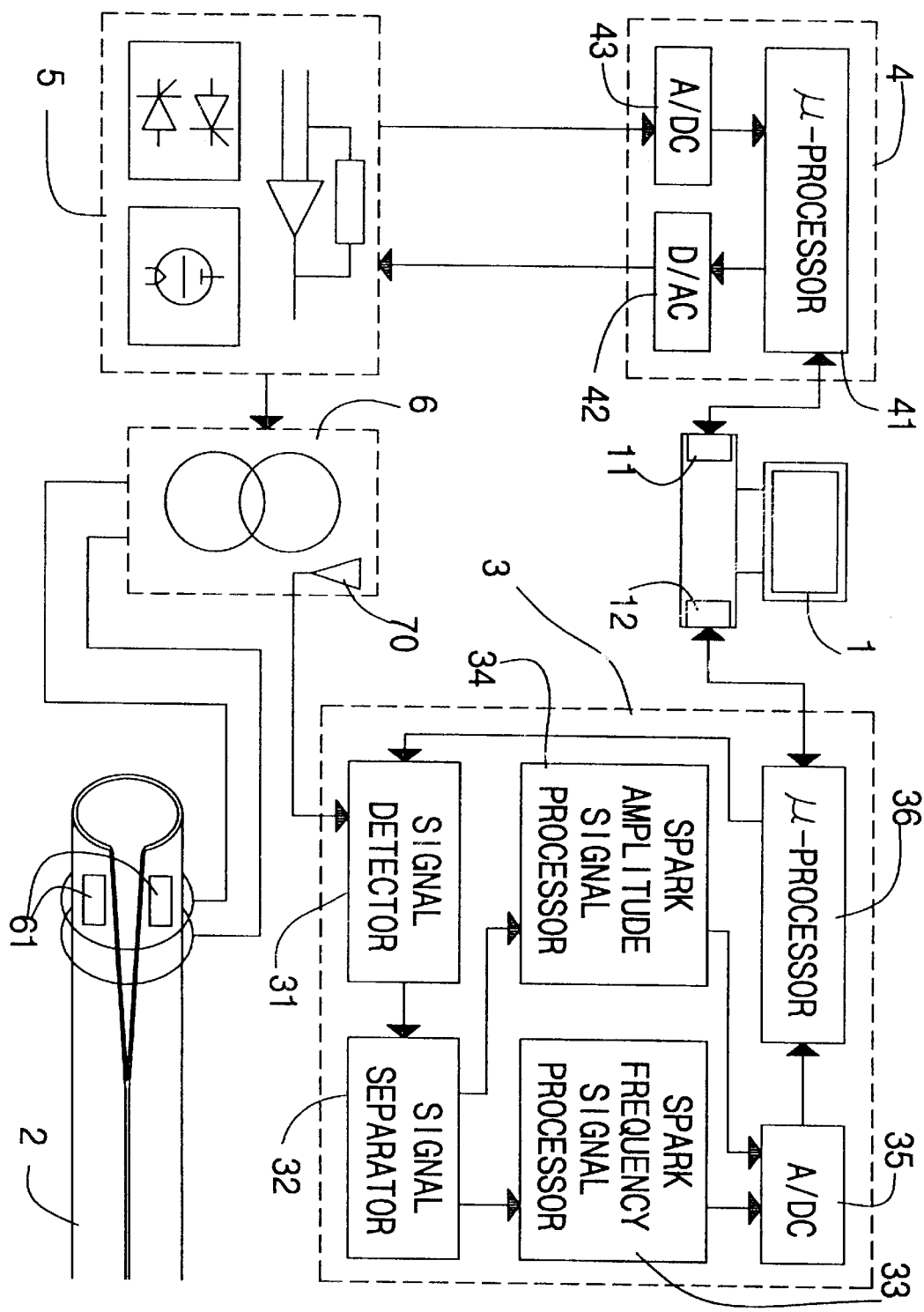
FIG. 2 is a block diagram illustrating the configuration of a system for automatically controlling the amount of input heat in a high-frequency electric resistance welding apparatus in accordance with the present invention.
Figure 3:
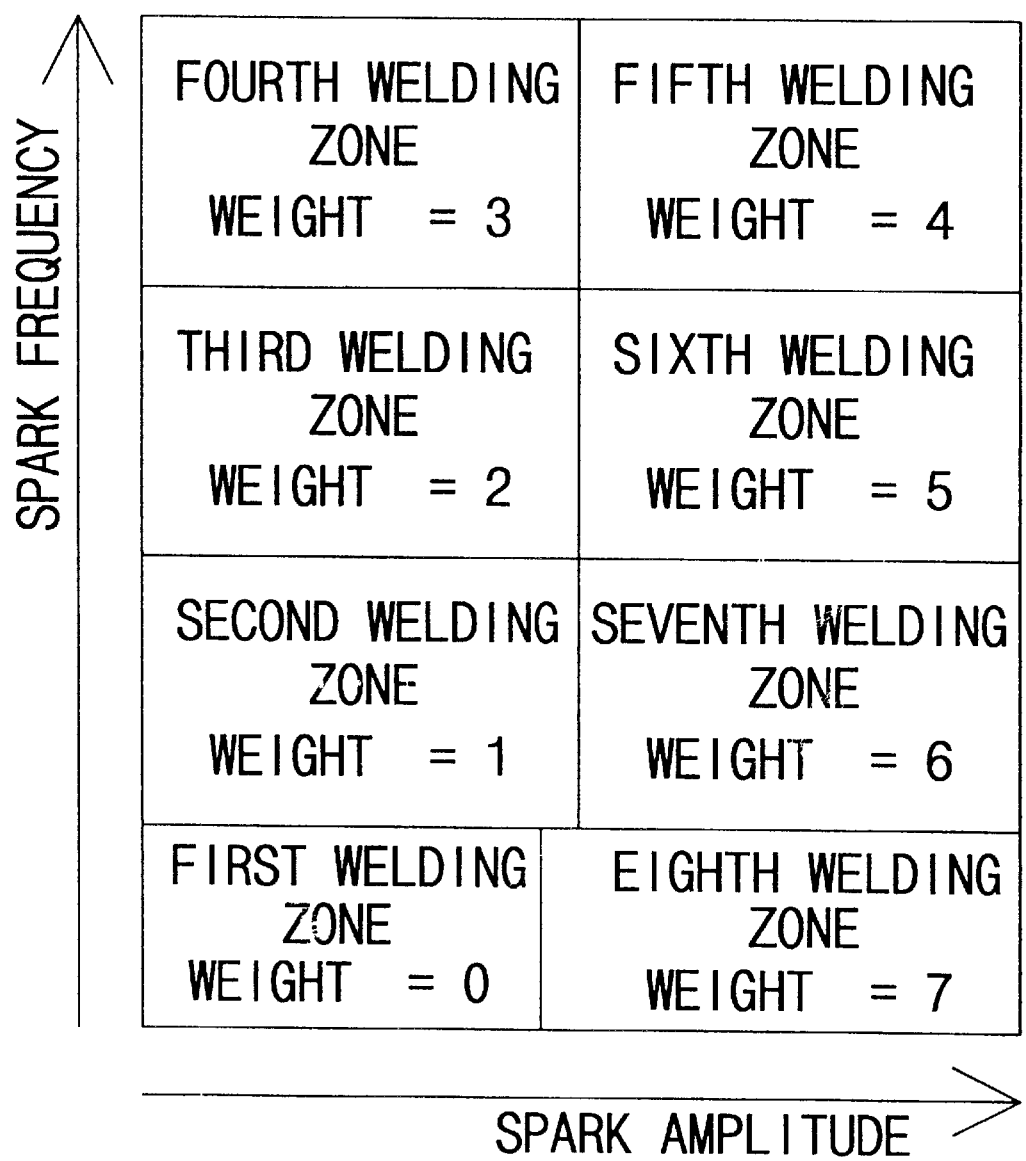
FIG. 3 is a graph illustrating the frequency and amplitude of sparks depending on the amount of input welding heat which is generated in each welding zone of the portion of an object to be welded.
Figure 4:
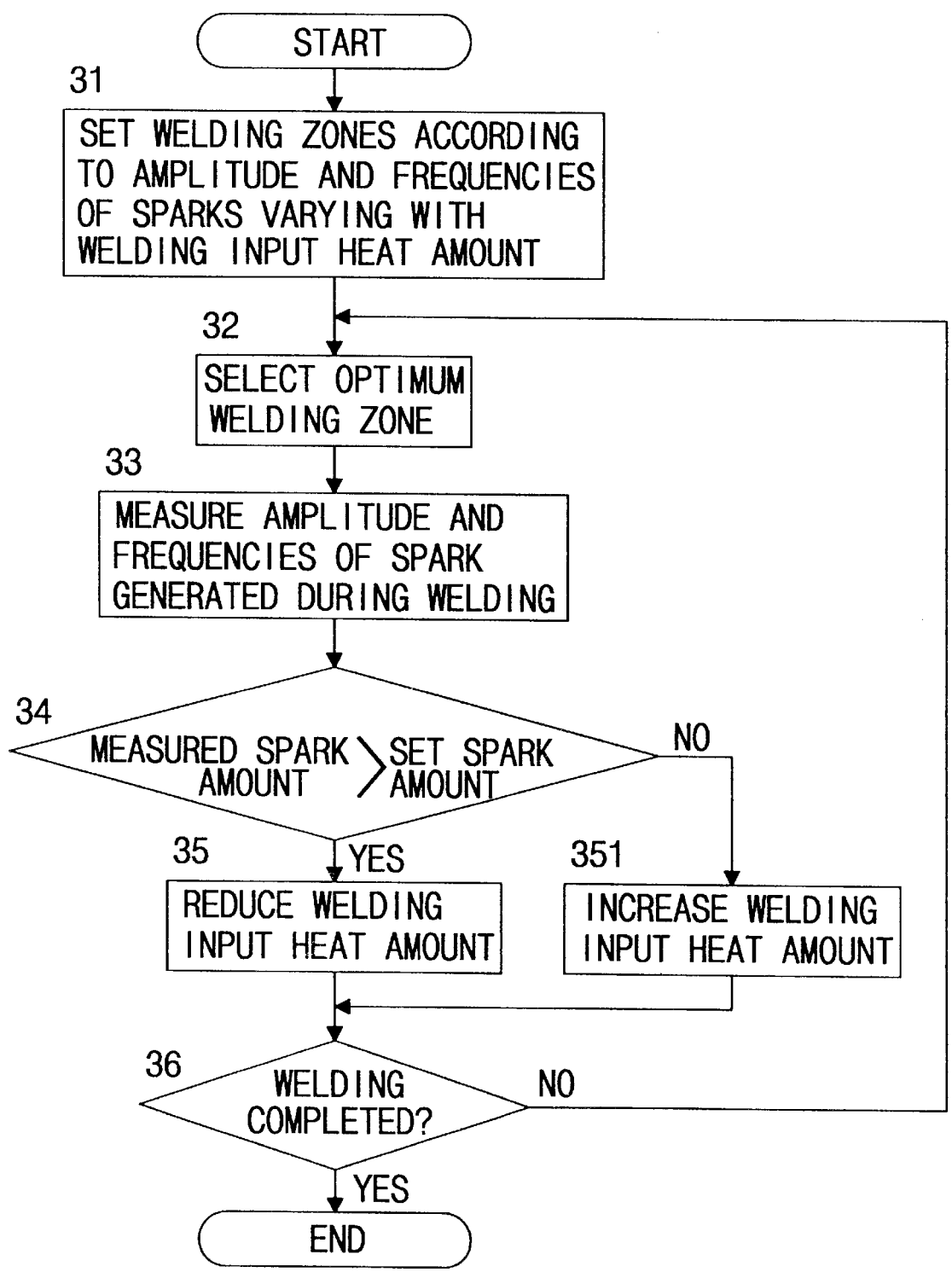
FIG. 4 is a flow chart illustrating a method for automatically controlling the amount of input heat in a high-frequency electric resistance welding apparatus in accordance with the present invention.

FIG. 1 schematically illustrates a flow of current generated in an object to be welded, in particular, in the manufacture of an electric resistance weld pipe using a high-frequency electric resistance welding apparatus. FIG. 2 illustrates the configuration of a system for automatically controlling the amount of input heat in a high-frequency electric resistance welding apparatus in accordance with the present invention. FIG. 3 illustrates the frequency and amplitude of sparks depending on the amount of input welding heat which is generated in each welding zone of the portion of an object to be welded. On the other hand, FIG. 4 is a flow chart illustrating a method for automatically controlling the amount of input heat in a high-frequency electric resistance welding apparatus in accordance with the present invention.

The characteristic of sparks generated when a metal object is welded using a high-frequency electric resistance welding method will be described in brief before the automatic input heat control system according to the present invention. Using a high-speed camera, it can be observed that when the welding of an object is carried out using a high-frequency electric resistance welding method, sparks are generated at edge portions of the object disposed in the vicinity of a welding point. In other words, the edge portions of the object are melted by high-frequency current supplied thereto. As a result, the melted metal flows by virtue of a large amount of current ranging from 1,000 A to 3,000 A. Such a phenomenon is called "a pinch instability". As the melted metal portions come into contact with each other, sparks are generated.

It is observed that the frequency, namely, generation rate, of such sparks increases gradually as the amount of input welding heat increases gradually. It is also observed that when the amount of input welding heat exceeds a certain level at which a maximum frequency of sparks is exhibited, the frequency of sparks decreases from the maximum level.

It is observed that the amplitude of such sparks increases as the amount of input welding heat increases. It is also observed that when a plurality of sparks are simultaneously generated due to an increase in the amount of input welding heat, the amplitude of sparks decreases.

Such a phenomenon is schematically illustrated in FIG. 1. An increase in the amount of input welding heat, $I_t$, results in an increase in the amount of melted metal. As the amount of melted metal increases, a bridge 22 is formed by the melted metal at an area spaced away from a welding portion 21 of the object. A portion $I_2$ of the welding current flows through the bridge 22. As a result, the bridge 22 is rapidly heated, thereby generating sparks. As such a bridge is formed at an area spaced apart from the welding point by an increased distance, the amount of current, $I_2$ passing through the bridge 22 is larger than the amount of current $I_1$, passing through the welding point. Accordingly, the amplitude of sparks generated at the bridge 22 increases.

Accordingly, the amount of input welding heat can be indirectly measured by measuring the frequency and amplitude of sparks. Thus, it is possible to efficiently control the amount of input welding heat by measuring and controlling the frequency and amplitude of sparks generated at a welding area.

FIG. 2 is a block diagram illustrating the configuration of an automatic input heat amount control system for a high-frequency electric resistance welding machine in accordance with the present invention. As shown in this drawing, the automatic input heat amount control system comprises a coil antenna 70 for sensing a spark signal which is generated by electromagnetic waves produced on portions of an object 2 to be welded, a spark signal processing unit 3 for filtering a desired signal component of the spark signal sensed by the coil antenna 70, separating the filtered signal component into amplitude and frequency signal components and processing the separated amplitude and frequency signal components, an induction coil 61 mounted on the object 2 for generating melting heat, and an oscillator 6 for supplying high-frequency current to the induction coil 61.

The automatic input heat amount control system further comprises a welding machine controller 5 for controlling the amount and frequency of current being supplied from the oscillator 6 to the induction coil 61, a welding machine power controller 4 for controlling the output of the welding machine controller 5, and a main controller 1 connected to the spark signal processing unit 3 and the welding machine power controller 4, for controlling the output of the welding machine power controller 4 in response to a spark signal fed back from the spark signal processing unit 3 to establish the optimum welding condition.

The spark signal processing unit 3 includes a spark detector 31 for filtering the desired signal component of the spark signal sensed by the coil antenna 70 and amplifying the filtered signal component, a signal separator 32 for separating an output signal from the spark detector 31 into amplitude and frequency signals, a spark frequency signal processor 33 for processing the frequency signal separated by the signal separator 32, a spark amplitude signal processor 34 for processing the amplitude signal separated by the signal separator 32, an analog/digital (A/D) converter 35 for converting analog signals from the spark frequency and amplitude signal processors 33 and 34 into digital signals, and a $\mu$-processor 36 for controlling the spark detector 31 in response to a control signal from the main controller 1, converting output data from the A/D converter 35 into serial data and outputting the converted serial data to the main controller 1.

The welding machine power controller 4 includes an A/D converter 43 for converting a status signal from the welding machine controller 5 into a digital signal, a digital/analog (D/A) converter 42 for converting a welding machine controller control signal into an analog signal and outputting the converted analog control signal to the welding machine controller 5, and a $\mu$-processor 41 for processing an output signal from the A/D converter 43, outputting the processed signal to the main controller 1 and applying the welding machine controller control signal to the D/A converter 42 in response to a control signal from the main controller 1.

The welding machine controller 5 is operated under the control of the welding machine power controller 4 to receive a single-phase or three-phase alternating current (AC) power, generate power with desired frequency and current amount and supply the generated power to the oscillator 6. To this end, the welding machine controller 5 may typically include a thyristor, an oscillating tube, etc.

The induction coil 61 is mounted on the object 2 to generate the melting heat. Typically, in the high-frequency electric resistance welding machine, the induction coil is used as a heat generator in the case where a steel pipe with a small diameter is manufactured. Alternatively, for manufacturing a steel pipe with a large diameter, a contact tip is attached to edge portions of the object to be used as a heat generator.

With the above-mentioned construction, the automatic input heat amount control system is adapted to establish the optimum welding condition when an electric resistance weld pipe is manufactured by the high-frequency electric resistance welding machine.

FIG. 4 is a flowchart illustrating an automatic input heat amount control method for a high-frequency electric resistance welding machine in accordance with the present invention. In accordance with the present invention, the automatic input heat amount control method is performed to establish the optimum welding condition when an electric resistance weld pipe is manufactured by the high-frequency electric resistance welding machine.

As shown in FIG. 4, the automatic input heat amount control method comprises step 31 of measuring amplitudes and frequencies of sparks varying with the amount of current being supplied to the induction coil and setting a plurality of welding zones (preferably, eight welding zones) as shown in FIG. 3 according to the measured results, step 32 of selecting the optimum one of the welding zones set at the above step 31 according to a welding condition, step 33 of starting welding in the welding zone selected at the above step 32 and measuring the amount (amplitude and frequency) of a spark generated during welding, step 34 of comparing the spark amount measured at the above step 33 with that in the welding zone selected at the above step 32, and steps 35, 351 and 36 of adjusting the amount of current being supplied to the induction coil in accordance with the result compared at the above step 34.

The operation of the automatic input heat amount control system for the high-frequency electric resistance welding machine with the above-mentioned construction in accordance with the present invention will hereinafter be described in detail.

First, before welding, the main controller 1 in the system measures spark amounts based on the variation of a welding input heat amount, sets separate welding zones according to the measured spark amounts and weights the set welding zones. Namely, the first welding zone is weighted '0', the second welding zone is weighted '1', the third welding zone is weighted '2', the fourth welding zone is m weighted '3', the fifth welding zone is weighted '4', the 1t sixth welding zone is weighted '5', the seventh welding zone is weighted '6' and the eighth welding zone is weighted '7'. Alternatively, the welding zone setting may be performed more minutely. Then, the main controller 1 checks the relation between the spark amounts and the welding qualities and selects one with the optimum welding quality from the set welding zones in accordance with the checked results.

In this manner, the optimum welding zone is selected by repetitively comparing the supplied current amount (welding input heat amount), spark data and welding status with one another.

Then, the main controller 1 starts welding in the optimum welding zone. At this time, the main controller 1 measures a spark amount generated during welding, in a manner as will hereinafter be mentioned in detail.

If high-frequency current is applied to the induction coil 61 mounted on the object 2, current flows as shown in FIG. 1 to melt edge portions of the object 2. As the edge portions of the object 2 are melted and then flow, they are joined at a welding point 21. At this time, a spark is generated at the melted portions of the object 2 by an electrical phenomenon resulting from the supplied high-frequency current. Namely, such a spark phenomenon results from an electromagnetic force generated by the fluidity of the melted portions and current flowing therethrough. The generated spark amount, or amplitude and frequency are varied in the pattern as shown in FIG. 3 according to the supplied welding input heat amount.

Then, the spark signal processing unit 3 measures the spark amplitude and frequency and feeds the measured results back to the main controller 1. Therefore, the main controller 1 reduces or increases the present welding input heat amount properly according to the fed back results to establish the optimum welding condition. In other words, provided that the optimum welding condition is established in the third welding zone, the main controller 1 maintains the welding condition optimally by varying the welding input heat amount on the basis of the corresponding spark amplitude and frequency.

As apparent from the above description, according to the present invention, when an electric resistance weld pipe is manufactured by the high-frequency electric resistance welding machine, the welding input heat amount is varied properly on the basis of a spark signal generated during welding to automatically maintain the welding condition optimally. Therefore, the present invention has the effect of enhancing the welding quality and increasing the productivity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An automatic input heat amount control system for a high-frequency electric resistance welding machine, comprising:

sensing means for sensing a spark signal which is generated by electromagnetic waves produced on portions of an object to be welded;

spark signal processing means for filtering a desired signal component of the spark signal sensed by said sensing means, separating the filtered signal component into amplitude and frequency signal components and processing the separated amplitude and frequency signal components;

heat generation means mounted on said object for generating melting heat;

oscillation means for supplying high-frequency current to said heat generation means;

welding machine control means for controlling the amount and frequency of current being supplied from said oscillation means to said heat generation means;

welding machine power control means for controlling the output of said welding machine control means; and main control means connected to said spark signal processing means and said welding machine power control means, for controlling the output of said welding machine power control means in response to a spark signal fed back from said spark signal processing means to establish the optimum welding condition;

whereby the optimum welding condition is established when an electric resistance weld pipe is manufactured by said high-frequency electric resistance welding machine.

2. An automatic input heat amount control system for a high-frequency electric resistance welding machine, as set forth in claim 1, wherein said spark signal processing means includes:

a spark detector for filtering the desired signal component of the spark signal sensed by said sensing means and amplifying the filtered signal component;

a signal separator for separating an output signal from said spark detector into amplitude and frequency signals;

a spark frequency signal processor for processing the frequency signal separated by said signal separator;

a spark amplitude signal processor for processing the amplitude signal separated by said signal separator;

an analog/digital converter for converting analog signals from said spark frequency and amplitude signal processors into digital signals; and a microprocessor for controlling said spark detector in response to a control signal from said main control means, converting output data from said analog/digital converter into serial data and outputting the converted serial data to said main control means.

3. An automatic input heat amount control system for a high-frequency electric resistance welding machine, as set forth in claim 1, wherein said welding machine power control means includes:

an analog/digital converter for converting a status signal from said welding machine control means into a digital signal;

a digital/analog converter for converting a control signal for the control of said welding machine control means into an analog signal and outputting the converted analog control signal to said welding machine control means; and a microprocessor for processing an output signal from said analog/digital conversion means, outputting the processed signal to said main control means and applying said control signal for the control of said welding machine control means to said digital/analog conversion means in response to a control signal from said main control means.

4. A method of automatically controlling an input heat amount of a high-frequency electric resistance welding machine, comprising the steps of:

(a) measuring amplitudes and frequencies of sparks varying with the amount of current being supplied to a heat generator and setting a plurality of welding zones according to the measured results;

(b) selecting the optimum one of said welding zones set at said step (a) according to a welding condition;

(c) starting welding in said welding zone selected at said step (b) and measuring the amount of spark generated during welding;

(d) comparing the spark amount measured at said step (c) with that in said welding zone selected at said step (b); and (e) adjusting the amount of current being supplied to said heat generator in accordance with the result compared at said step (d);

whereby the optimum welding condition is established when an electric resistance weld pipe is manufactured by said high-frequency electric resistance welding machine.

* * * * *